United States Patent [19]

MacRae

[11] Patent Number: 5,465,986
[45] Date of Patent: Nov. 14, 1995

[54] WHEEL RESTRAINING DEVICE FOR A SHOPPING CART OR A PORTABLE VEHICLE

[76] Inventor: Elwyn F. MacRae, 309 Skylark Dr., Bloomingdale, Ill. 60108

[21] Appl. No.: 65,494

[22] Filed: May 24, 1993

[51] Int. Cl.[6] .................................................. B62B 3/00
[52] U.S. Cl. .................. 280/33.994; 280/47.34; 188/19
[58] Field of Search .............. 280/33.991, 33.992, 280/33.993, 33.994, 47.34; 188/5, 6, 7, 19, 20, 21

[56] References Cited

U.S. PATENT DOCUMENTS

| | | | |
|---|---|---|---|
| 3,500,965 | 3/1970 | Nossokoff et al. | 280/33.994 |
| 3,590,962 | 7/1971 | Parker et al. | 280/33.994 |
| 3,771,628 | 11/1973 | Close | 188/189 |
| 3,951,426 | 4/1976 | Shaffer et al. | 280/47.3 |
| 4,018,449 | 4/1977 | Anderson | 280/33.994 |
| 4,084,663 | 4/1978 | Haley | 280/33.994 |
| 4,111,623 | 9/1978 | Black | 425/19 R |
| 4,116,464 | 9/1978 | Haley | 280/647 |
| 4,524,985 | 6/1985 | Drake | 280/33.994 |
| 4,545,591 | 10/1985 | Balha | 280/33.994 |
| 4,580,800 | 4/1986 | Upton et al. | 280/33.994 |
| 4,603,871 | 8/1986 | McNeill | 280/33.994 |
| 4,633,544 | 1/1987 | Hicks | 16/35 R |
| 4,767,128 | 8/1988 | Terhune | 188/19 |
| 4,779,321 | 9/1988 | Black | 29/150 |
| 4,819,767 | 4/1989 | Baird | 188/21 |
| 4,976,447 | 12/1990 | Batson | 280/33.994 |
| 5,040,641 | 8/1991 | Phillips et al. | 188/1.12 |
| 5,103,530 | 4/1992 | Andrisin et al. | 16/20 |
| 5,288,059 | 2/1994 | Bowers et al. | 280/33.994 |

*Primary Examiner*—Richard M. Camby
*Attorney, Agent, or Firm*—Charles F. Meroni, Jr.

[57] ABSTRACT

The present invention relates to an improved, low-cost shopping cart construction and more specifically, to a shopping cart having a braking device to prevent unintentional movement of the cart, said braking device providing a slight resistance on all four wheels. This invention provides a constant resistance on one or all of the wheels of the shopping cart making it more difficult for the shopping cart to roll around in a parking lot due to inclines and gusts of wind thereby preventing damage to vehicles in the parking lot. The resistance on the wheels is not too great so as to still make it easy for the customer to push the shopping cart.

12 Claims, 3 Drawing Sheets

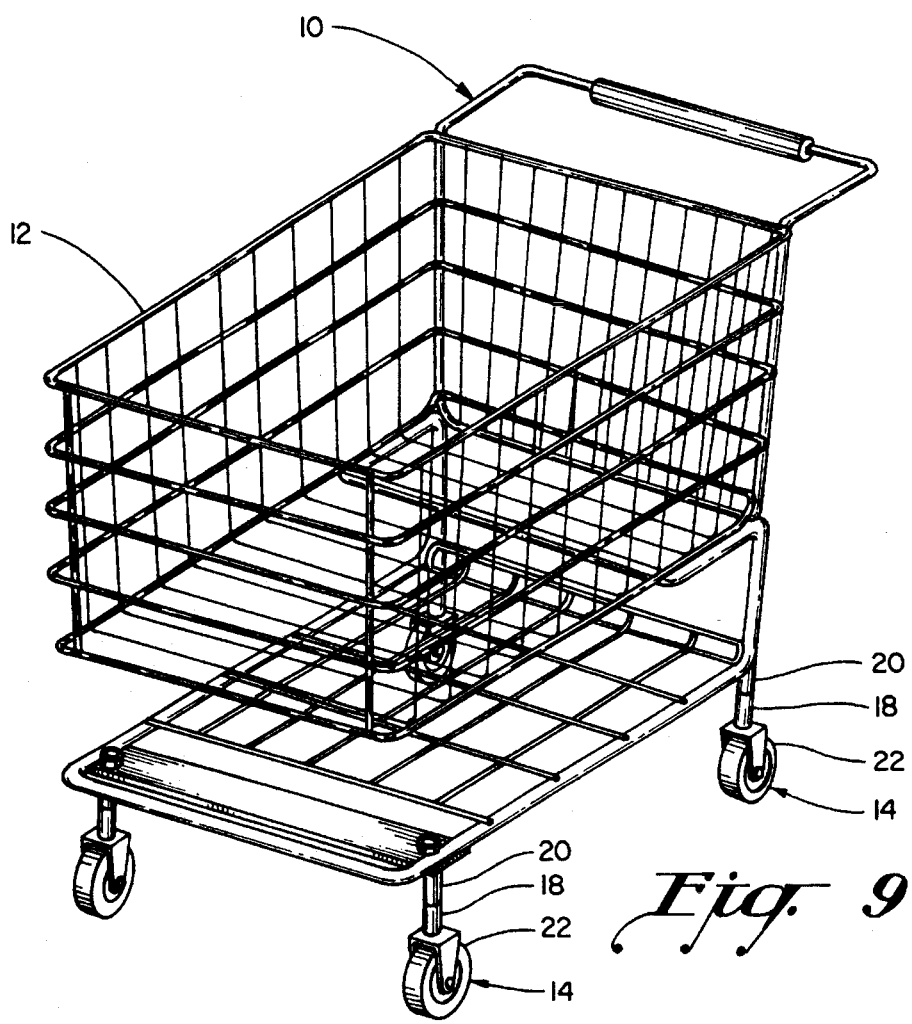
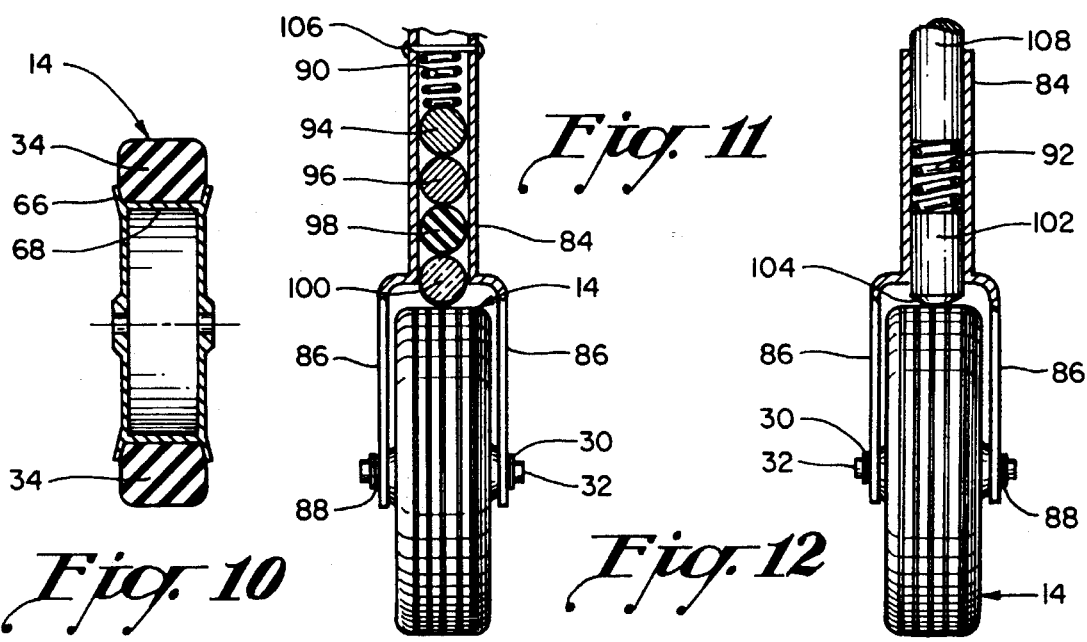

WHEEL RESTRAINING DEVICE FOR A SHOPPING CART OR A PORTABLE VEHICLE

BACKGROUND OF THE INVENTION

The present invention relates to a goods hauling vehicle wheel or shopping cart wheel having a series of different types of braking devices. It is contemplated that my braking devices can be used on shopping carts and other goods hauling vehicles, as may be desired. These braking devices all operate to provide a controlled braking action to shopping cart wheels in which the braking devices are self activated to inhibit movement of the wheels when the cart is left unattended. In one form of my inventions I have provided a shopping cart which is supported on a set of wheels with wheel supporting yokes secured at corners of the cart to the cart. The yokes each having a pair of tubular yoke legs positioned on opposite sides of each wheel. A brake structure is mounted within the tubular yoke legs and comprises compression springs mounted above and below the axle. Each of the springs coacting with a metal plate and exerting a spring force against the axle to resist and inhibit rotation of the axle and wheels supported thereon.

Another braking device relates to a shopping cart that is supported on a set of wheels with wheel supporting yokes secured at corners of the cart to the cart. The yokes each having a pair of yoke legs positioned on opposite sides of each wheel. A brake structure is mounted on the sides of each wheel and comprises a plurality of flexible fingers. The fingers being sized so as to have a length slightly greater than a distance between the inside surface of the yoke legs and the outside surface of the wheels, so that as the wheel rotates, the flexible fingers will strike the yoke legs to resist and inhibit rotation of the wheels relative to the yoke.

Still another braking device relates to a brake structure mounted and enclosed inside each wheel of a shopping cart. The brake structure comprising a hollow portion containing a preselected number such as four equally spaced walls affixed to the inside of the wheel creating four pockets. The hollow portion also includes a plurality of weighted objects free to move from pocket to pocket as the wheel is being rotated, so that as the wheel rotates, the weighted objects will provide a lower center of gravity to each wheel at all times and will continually resist and inhibit rotation of the wheels.

Yet another braking device relates to a shopping cart that is supported on a set of wheels with wheel supporting yokes secured at corners of the cart to the cart and in which each of the yokes have an open bottom. A brake structure is mounted inside each of the yokes. The brake structure includes a compression spring in which the compression spring is mounted above a friction device. The friction device extends through the bottom of the yoke and exerts a continuous force against the outer circumference of the wheel supported by the yoke. The friction device will therefore resist and inhibit rotation of the wheels.

DESCRIPTION OF THE PRIOR ART

The shopping carts commonly used in supermarkets and like shopping areas are not provided with any braking means. Accordingly, these shopping carts tend to cause damage as, for example, m parked vehicles in the parking lot because the shopping carts tend to roll down inclines or because of gusts of wind. Many stores usually have a budget or insurance to pay for vehicle damage caused by their shopping carts in the parking lot. In the past, various suggestions have been made that shopping carts be provided with brake means in order to prevent such happenings. These braking devices, however, have not been found to be commercially successful: most because they are too expensive and are not cost effective, some apparently because they require the conscious action of the user in order to actuate the brake, others because they have been applied to only a single wheel of the shopping cart thereby permitting the cart to pivot around the locked wheel even though the brake has been applied. In addition, many of these devices have been undesirable because it has been necessary to individually release the brakes on all of the carts in a row when they have been stacked for movement from the parking lot to the store.

Many wheel restraining devices require some type of action on the user in order activate or deactivate the braking device.

For example, Haley in U.S. Pat. No. 4,084,663 discloses an automatic brake for wheeled carriages having slidable brake rods which were spring biased. The brakes on the shopping carts are released by a finger grip of the pusher or by a lever actuated by the upswing of a rearward nesting gate.

Also, Balha in U.S. Pat. No. 4,545,591 discloses a shopping cart which includes a mechanism whereby the wheels are locked when the cover is open and unlocked when the cover is closed, although the wheel lock may be operated manually if the cover is held open by overloading the basket.

Further, Laird in U.S. Pat. No. 4,819,767 discloses a hand brake apparatus for installation on wheeled trucks of the type having a load supporting frame and at least two laterally opposed support wheels having a fixed direction supporting the frame for movement over the ground and a handle portion for moving and directing the load supporting frame.

Additionally, Batson in U.S. Pat. No. 4,976,447 relates a method and apparatus for a hand-operated, adjustable, braking or restraining device for effectively restraining the movement of wheeled carts.

Also the Phillips et al. U.S. Pat. No. 5,040,641 discloses a wheel assembly having particular adaptability for use on a shopping cart which importantly serves to prevent shopping cart movement after release by the user.

Further the Anderson U.S. Pat. No. 4,018,449 discloses a cart having a spring biased wheel lock, handle actuated release means for the lock, automatic lock release means actuated by a nested cart, and an intercart coupling means.

These apparatus' are of the type which are constantly in a condition to apply a braking or retarding force to the wheels of the cart unless a bar or control lever is held in a deactivated position by a customer. Although this type of brake has served its purpose, it has not proved entirely satisfactory under all conditions of service for the reason that in some cases it is inconvenient if not impossible for the customer to manually hold the brake in a deactivated position during the moving of the shopping cart for the reason that in many instances the customers hands are occupied examining merchandise or guiding the activities of small children.

Also in some instances, the customer will push the cart through the store, unaware that the brake is actuated, thus causing the friction between the nonrotating wheel and the floor to wear a flat spot on the wheel, thus prematurely causing the wheel to need replacement. Other manually engaged brake mechanisms are effective when correctly applied by the customer, however, the customer cannot always by counted on to apply the brake when the shopping cart is left in the parking lot.

Other various wheel restraining devices for a shopping cart have been proposed and have not become commercially successful.

For example, Black in U.S. Pat. No. 4,111,623 relates a method and apparatus for assembling a bearing assembly having bearings therein in a wheel having a hole in the center thereof with a diameter greater than the outer diameter periphery of the bearing assembly.

Also, Drake in U.S. Pat. No. 4,524,985 relates to an arrest or anti-theft device for a cart in which the connecting structure can take the form of a spring which is continuously flexible in a front-to-back direction with respect to the cart.

Further, Hicks in U.S. Pat. No. 4,633,544 relates to an improved wheel assembly for use with a shopping cart to restrain the cart against rolling movement when parked. The improved wheel assembly comprises a wheel rotatably supported on the cart by a friction bearing unit which imparts a predetermined frictional resistance to the rolling movement of the wheel.

Additionally, Black in U.S. Pat. No. 4,779,321 discloses a wheel bracket mounting structure which includes an elongated and flexible bracket member having an axle mounting section and a stem mounting section at generally opposite end thereof.

Still other various wheel restraining devices for a shopping cart have been proposed and have not become commercially successful.

For example, Andrisin, III et al, in U.S. Pat. No. 5,103,530 discloses a hub and wheel assembly having tandem wheels and a shock absorbing member in a trailing link suspension configuration.

Also, Parker in U.S. Pat. No. 3,590,962 discloses a metering brake placed upon the frame of a shopping cart wheel. A locking pin projects through the housing and is biased to engage a stop carried on the wheel but is held from engagement by a pivotal holding bracket.

Further, Close in U.S. Pat. No. 3,771,628 discloses a wheel retarder for use on wheeled vehicles which is automatically engaged when the speed of the vehicle exceeds a desired maximum and remains engaged until the cart is brought to a complete stop.

Additionally, Shaffer in U.S. Pat. No. 3,951,426 discloses a brake system for a cart whereby a brake disc is associated with each hub and is restrained from rotation but is movable with respect to the longitudinal axis of the axle. A brake element is provided for each disc consisting of a movable and fixed shoe.

In accordance with the present invention, the disadvantages over the prior art have been overcome by the provision of a braking mechanism which provides a constant resistance to all four wheels that would inhibit rotation of the wheels. The resistance is not too great so as to inhibit a user from being able to push the shopping cart, however. The resistance is enough to prevent the shopping cart from rolling about in an open parking lot due to uneven pavement and wind gusts. The present invention provides a simplified, low-cost shopping cart that contains a braking mechanism which resists unintentional movement of the carts in the parking lot.

SUMMARY OF THE INVENTION

In accordance with my invention I have provided a shopping cart supported on a set of wheels, the wheels each having an axle with each wheel being mounted on the axle, the wheels being rotatable as the cart is moved on its wheels, and a brake structure is mounted on the cart and operatively connected to the wheels, the brake structure exerts a force against an outer portion of an associated one of the wheels through an open end supported by a tubular yoke being a pintle axle of the associated wheel to inhibit rotation of the axle and the wheels supported thereon, the force exerted by the brake structure is such that when the shopping cart is standing free and unattended, such as in a parking lot, the force is sufficient to prohibit the shopping cart from freely rolling around, the force, however, being insufficient to curb the movement of the cart when being pushed by the user.

Other features of my shopping cart braking device relate to a shopping cart supported on a set of wheels, wheel supporting yokes secured at corners of the cart to the cart, the wheels each having an axle with each wheel being mounted on the axle and being rotatable with the axle as the cart is moved on its wheels, the yokes each having a pair of tubular yoke legs positioned on opposite sides of each wheel, the tubular yoke legs having a pair of holes to fit the axle and to mount the wheel thereon with each hole having room for the axle to move up and down, a brake structure is mounted within the tubular yoke legs, the brake structure comprises compression springs mounted above and below the axle, a metal plate fixed on one end of each compression spring closest to the axle of the wheel, the compression spring and the metal plate coact to exert a spring force against the axle to resist and inhibit rotation of the axle and wheels supported thereon.

Further features of my shopping cart braking device relate to a shopping cart supported on a set of wheels, wheel supporting yokes secured at corners of the cart to the cart, the wheels each having an axle with each wheel being mounted on the axle and being rotatable about the axle as the cart is moved on its wheels, the yokes each having a pair of legs positioned on opposite sides of each wheel, and a brake structure is mounted on the sides of each wheel, the brake structure comprises a plurality of flexible fingers, the fingers being sized so as to have a length slightly greater than a distance between the inside surface of the legs of the yokes and the outside surface of the wheels, so that as the wheel rotates, the flexible fingers will strike the legs of the yoke to resist and inhibit rotation of the wheels relative to the yoke.

Still other features of my invention relate to a shopping cart supported on a set of wheels, wheel supporting yokes secured at corners of the cart to the cart, the wheels each having an axle with each wheel being mounted on the axle and being rotatable about the axle as the cart is moved on its wheels, the wheels each having opposing covers mounted on opposite sides, the yokes each having a pair of legs positioned on opposite sides of each wheel, and a brake structure is mounted inside each wheel and enclosed by the opposing covers, the brake structure comprises a hollow portion, the hollow portion contains a plurality of pocket defining walls affixed to the inside of the wheel creating a number of pockets, the hollow portion also contains a plurality of weighted objects free to move from one pocket to the next pocket as the wheel is being rotated, so that as the wheel rotates, the weighted objects will provide a lower center of gravity to each wheel at all times and will continually resist and inhibit rotation of the wheels.

Yet other features of my shopping cart braking device relate to a shopping cart supported on a set of wheels, wheel supporting tubular yokes secured at corners of the cart to the cart, the tubular yokes having yoke legs positioned on opposite sides of each wheel, the tubular yokes having a lower open end for overlying the outer circumference of the wheel, the wheels each having an axle with each wheel being mounted on the axle and being rotatable about the axle as the cart is moved on its wheels, a brake structure is mounted inside the tubular yokes, the brake structure comprises a compression spring, a friction device positioned beneath the compression spring inside the tubular yoke, a shoulder structure mounted above the compression spring holding the spring in place, the friction device exerts a force against the wheel through the open end supported by the tubular yoke, the friction device is a material selected from the group consisting of a series of weighted spherical balls and a solid tubular plunger, the friction device is positioned to rub against the outer circumference of the wheels and to inhibit rotation of the wheels.

It is a further object of my invention to provide a portable vehicle supported on a set of wheels, the wheels each having an axle with each wheel being mounted on the axle, the wheels being rotatable as the vehicle is moved on its wheels, and a brake structure exerting a force against an associated one of the wheels to inhibit rotation of the axle and the wheels supported thereon, the force exerted by the brake structure being such that when the vehicle is standing free and unattended, the force is sufficient to prohibit the vehicle from freely rolling around, the force, however, being insufficient to curb the movement of the vehicle when being pushed by a user.

BRIEF DESCRIPTION OF THE DRAWINGS

FIG. 9 is a perspective view of a shopping cart having a braking device embodying the present invention mounted thereon;

FIG. 10 is a cross-sectional view of the wheel illustrating the construction of the wheels in FIGS. 5 and 7;

FIG. 11 is a fragmentary partially sectioned view illustrating another type of wheel braking device embodying further features of my invention; and FIG. 12 is a fragmentary partially sectioned view illustrating a slight modification of the braking device shown in FIG. 9.

DESCRIPTION OF THE PREFERRED EMBODIMENT

Figure 1:
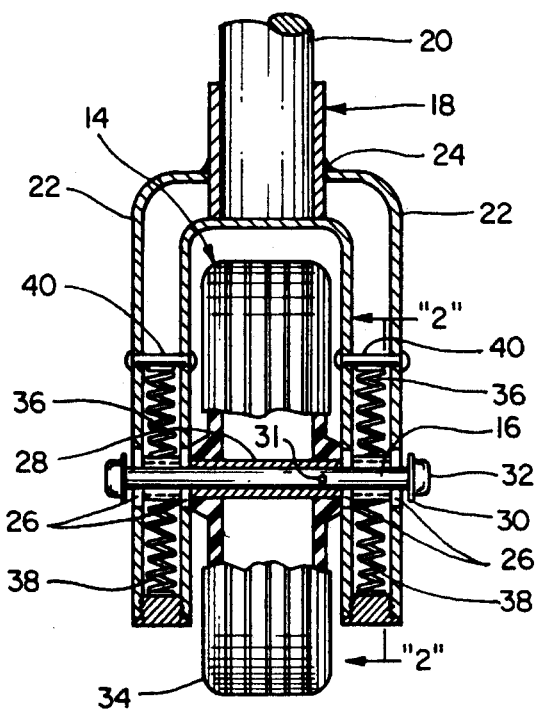
FIG. 1 is a fragmentary partially sectioned view illustrating a wheel structure on a shopping cart with a wheel braking device embodying important features of my invention.

Referring now to the drawings, shopping cart 10 is of common construction and includes a basket 12 positioned and secured in place on a supporting structure that includes four wheels 14 each rotatably mounted on an axle 16 which in turn are mounted on wheel yokes 18.

Figure 2:
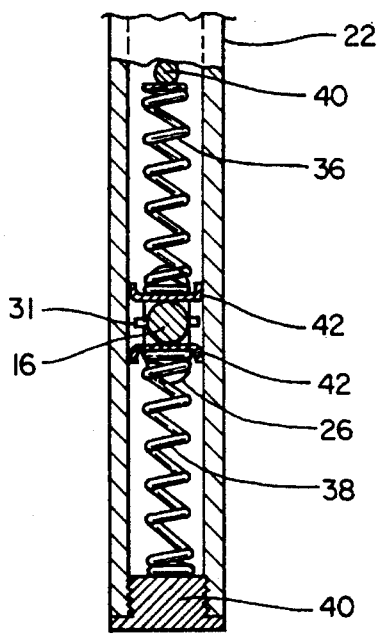
FIG. 2 is an enlarged fragmentary vertical section as appearing on the line "2"—"2" looking in the direction indicated by the arrows as seen in FIG. 1.

Referring to FIGS. 1 and 2, the yokes 18 are secured to a corner stem 20 from the shopping cart 10. The yokes 18 are also secured to a pair of tubular yoke legs 22 by a weld 24. The tubular yoke legs 22 are positioned on opposite sides of each wheel 14 and each yoke leg 22 has a pair of holes 26 to fit the axle 16, with the holes 26 leaving room for the axle 16 to move up and down. A wheel bearing sheath 28 is fixed through the center of each wheel 14 and is sized for the axle 16 to fit through the inside of the sheath 26. Both ends of the axle 16 are fitted through each of the tubular yoke legs 22. An axle pin 28 is fitted through the axle 16 and is engaged within the wheel bearing sheath 28 in order for the axle to rotate as the wheel rotates. A washer 30 and a cap 32 is mounted on the ends of each axle 16 to keep the wheel 14 aligned with the tubular yoke legs 22, to keep the axle 16 and wheel 14 in place. Each wheel 14 is surrounded with rubber 34 around the outside circumference of the wheel. A brake structure is mounted within the tubular yoke legs 22 and comprises compression springs 36, 38 mounted above and below the axle 16. A pin 40 is attached through each tubular yoke leg 22 above the axle 16 to keep the upper compression spring 36 in place. A tubular yoke leg closure 40 is fixed on the bottom of each tubular yoke leg 22 and keeps the lower compression spring 38 in place. A metal plate 42 is fixed on one end of each compression spring closest to the axle 16 of the wheel 14 and the metal plate 42 remains in constant contact with the axle. Each spring 36, 38 and metal plate 42 exerts a force against the axle 16 to resist and inhibit rotation of the axle and the wheels 14 supported thereon. The spring force is insufficient to curb the movement of the shopping cart when being pushed by a user.

Figure 3:
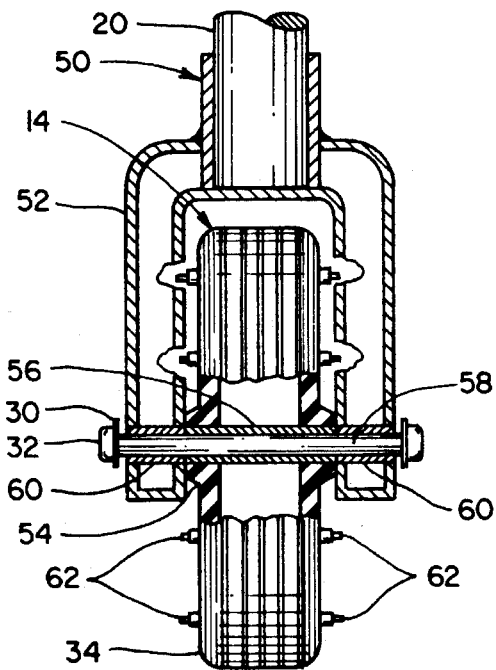
FIG. 3 is a fragmentary partially sectioned view illustrating a modified type of braking device also embodying important features of my invention.
Figure 4:
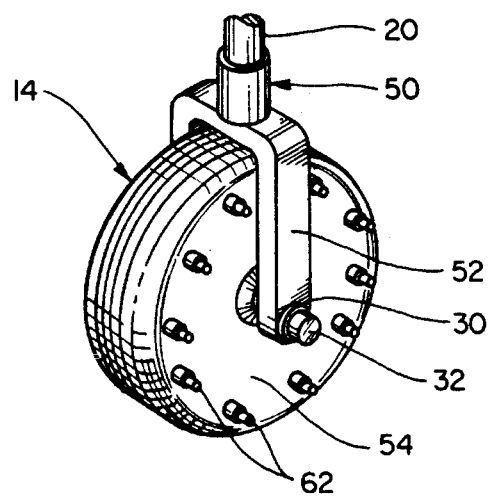
FIG. 4 is a fragmentary perspective view of the wheel structure and braking device as shown in FIG. 3.

Referring to FIGS. 3 and 4, the yoke 50 is secured to a corner stem 20 from the shopping cart 10. The yokes 50 each have a pair of yoke legs 52 positioned on opposite sides of each wheel 14. Wheel covers 54 are mounted on opposite sides of each wheel 14. A wheel bearing sheath 56 is fixed through the center of each wheel 14 and wheel cover 54. The wheel bearing sheath 56 is sized for the axle 58 to fit through the inside of the sheath 56. A yoke leg bearing sheath 60 is fixed through the sides of each yoke leg 52 and is also sized for the axle 58 to fit through the inside of the yoke leg bearing sheath 60. Both ends of the axle 58 are fitted through each of the yoke leg bearing sheaths 60. A washer 30 and a cap 32 is mounted on the ends of each axle 58 to keep the wheel 14 aligned with the yoke legs 52, to provide free rotation of the wheels and to provide an easy method for replacing the wheels. Each wheel 14 is surrounded with rubber 34 around the outside circumference of the wheel. Another type of brake structure is here shown as a plurality of flexible fingers 62 and are mounted on the outside of each wheel cover 54. The flexible fingers 62 are sized so as to be just long enough to make contact with the yoke legs 52 as the wheel 14 is rotating. Therefore, the flexible fingers 62 will provide resistance as they strike the yoke legs 52 and will inhibit the rotation of the wheels 14. The resistance of the flexible fingers 62 is insufficient to curb the movement of the shopping cart when being pushed by a user.

Figure 5:
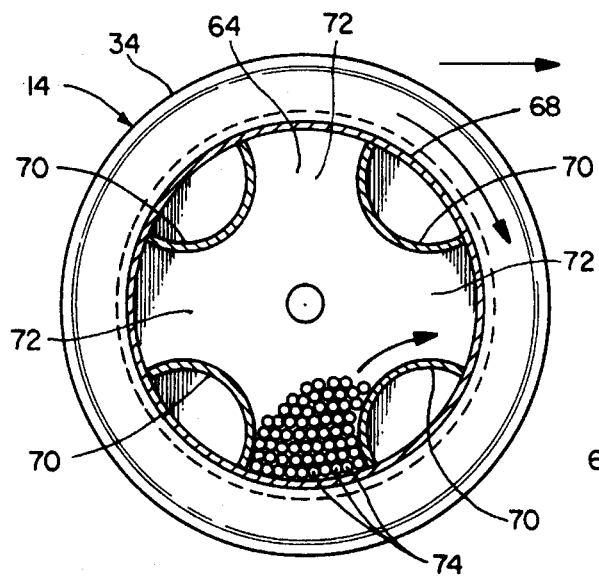
FIG. 5 is a side view partially in section illustrating another type of wheel braking device embodying further features of my invention.
Figure 6:
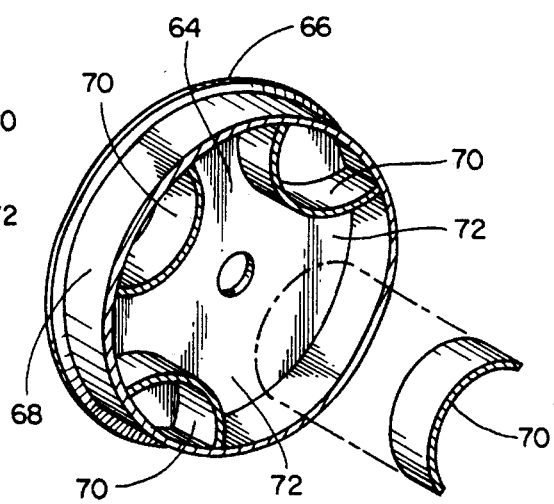
FIG. 6 is an exploded partially sectioned perspective view of the braking device shown in FIG. 5 with components shown in full and dotted lines illustrating the manner of assembly of the components.

Referring to FIGS. 5, 6 and 10, the wheels 14 are similar to those referred to in FIG. 1 and each wheel has a hollow portion 64. Each of the wheels 14 are enclosed by covers 66 on opposite sides. The wheels each have a circular annular sleeve 68 positioned between the covers 66. Each wheel 14 is surrounded with rubber 34 around the outside circumference of the circular annular sleeve 68 and is fitted between the covers 66. The hollow portion 64 of the wheel 14 contains an equally spaced series of four semi-circular walls 70 fixed to the inside of the annular sleeve 68 creating four equally spaced pockets 72 within the wheel. The hollow portion 64 also contains a plurality of weighted objects 74 that are free to move from one pocket 72 to the next pocket as the wheel 14 is being rotated. The amount of weighted objects 74 is enough to fill one entire pocket 72. So that as the wheels 14 rotate, the weighted objects 74 will provide a lower center of gravity to each wheel at all times and will continually resist and inhibit the rotation of the wheels. The resistance created by the weighted objects 74 is insufficient to curb the movement of the shopping cart when being pushed by a user.

Figure 7:
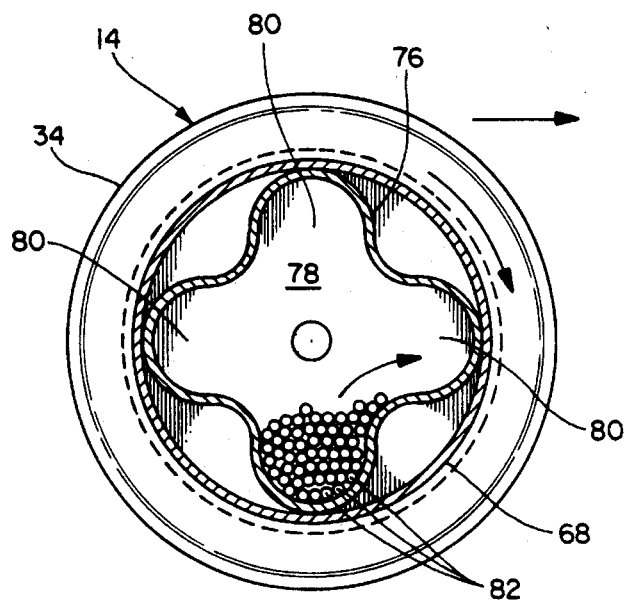
FIG. 7 is a side view partially in section similar to FIG. 5 only illustrating a further modification of my invention.
Figure 8:
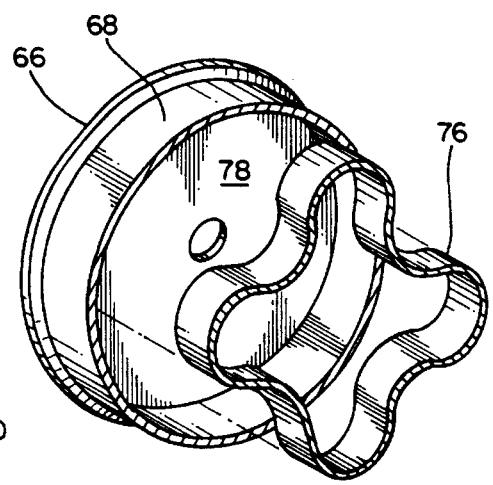
FIG. 8 is an exploded partially sectioned perspective view of the braking device shown in FIG. 7.

Referring to FIGS. 7 and 8, the wheels 14 are similar to those referred to in FIGS. 5, 6 and 10. Each of the wheels are enclosed by covers 66 on opposite sides. The wheels 14 each have a circular annular sleeve 68 positioned between the covers 66. Each wheel 14 is surrounded with rubber 34 around the outside circumference of the circular annular sleeve 68 and is fitted between the covers 66. Each wheel 14 also contains a shaped annular sleeve 76 positioned within the circular annular sleeve 68 and between the covers 66. Each wheel 14 has a hollow portion 78 that is enclosed by the covers 66 and the shaped annular sleeve 76. The shaped annular sleeve 76 is formed to have four equally spaced pockets 80 and the bottom of each pocket is fixed to the inside of the circular annular sleeve 68. The hollow portion 78 also contains a plurality of weighted objects 82 that are free to move from one pocket 80 to the next pocket as the wheel 14 is being rotated. The amount of weighted objects 82 is enough to fill one entire pocket 80. So that as the wheels 14 rotate, the weighted objects 82 will provide a lower center of gravity to each wheel at all times and will continually resist and inhibit the rotation of the wheels. The resistance created by the weighted objects 82 is insufficient to curb the movement of the shopping cart when being pushed by a user.

Referring to FIGS. 11 and 12, the shopping cart 10 has tubular yokes 84 having an open bottom and the yokes each have a pair of yoke legs 86 positioned on opposite sides of each wheel 14, the tubular yokes 84 being pintle axles of its associated wheels. The wheel 14 is held in place by an axle 88 that fits through the center of the wheel 14 and both ends of the axle are fitted through each of the yoke legs 86. A washer 30 and a cap 32 is mourned on the ends of each axle 88 to keep the wheel 14 aligned with the yoke legs 86, to provide free rotation of the wheels and to provide an easy method for replacing the wheels. Each wheel 14 has a brake structure mourned inside the tubular yokes 84. The brake structure comprises a compression spring 90, 92 in which the compression spring is mounted above a friction device 94, 96, 98, 100 and 102. The friction device exerts a downward force through the open bottom of the tubular yoke 84 against the outer diameter of the wheel 14 causing a braking action. The friction device comprises either of a series of vertically stacked balls 94, 96, 98 and 100 mounted in the tubular yoke 84 with the lowest ball 100 being in contact with the outside circumference of the wheel 14 and the highest ball 94 being in contact with the compression spring 90, or of a tubular plunger 102 having a closed conical shaped bottom 104 mourned in the tubular yoke with the closed bottom being in contact with the outside circumference of the wheel and the opposite end of the tubular plunger 102 being in contact with the compression spring 92. The upper portion of the compression spring 90 is held in place by either a pin 106 that is mounted through the tubular yoke 84, or the compression spring 92 is held in place by the shaft 108 from the leg of the shopping cart 10. This braking structure exerts a constant force against the outer diameter of the wheel 14 and inhibits the rotation of the wheels. The resistance created by the friction devices is insufficient to curb the movement of the shopping cart when being pushed by a user.

As various possible embodiments may be made in the above invention for use for different purposes and as various changes might be made in the embodiments and method above set fort, it is understood that all of the above matters here set forth or shown in the accompanying drawings are to be interpreted as illustrative and not in a limiting sense.

I claim:

1. In combination, a shopping cart supported on a set of wheels, said wheels each having an axle with each wheel being mounted on the axle, said wheels being rotatable as the cart is moved on its wheels, tubular yokes, said tubular yokes being secured at corners of the cart to the cart, said wheels being rotatable about the axle as the cart is moved on its wheels, and brake means mounted on the cart and operatively connected to said wheels, said brake means exerting a force against an outer portion of an associated one of the wheels through an open end supported by a tubular yoke being a pintle axle of the associated wheel to inhibit rotation of the axle and the wheels supported thereon, said tubular yokes having yoke legs positioned on opposite sides of each wheel, said tubular yokes having a lower open end for overlying the outer circumference of the wheel, said brake means is mounted inside the tubular yokes, said brake means comprising a compression spring, friction means positioned beneath said compression spring inside the tubular yoke, shoulder means mounted above said compression spring holding said spring in place, said friction means exerting a force against the wheel through the open end supported by the tubular yoke, said friction means is a material selected from the group consisting of a series of weighted spherical balls and a solid tubular plunger, said friction means being positioned to rub against the outer circumference of the wheels and to inhibit rotation of the wheels, the force exerted by the brake means being such that when the shopping cart is standing free and unattended, such as in a parking lot, the force is sufficient to prohibit the shopping cart from freely rolling around, the force, however, being insufficient to curb the movement of the cart when being pushed by a user.

2. The combination of claim 1 wherein the solid tubular plunger has a conical shaped head for engaging the wheel, the conical shaped head providing a reduced surface for exerting a braking action upon said wheel.

3. The combination of claim 1 wherein the shoulder means comprises a pin extended transversely through said tubular yoke, and means attaching said pin at its opposite ends to an associated one of the tubular yokes.

4. The combination of claim 1 wherein the shoulder means comprises a tubular shaft mounted within said tubular yoke, and means attaching said tubular shaft to an associated one of the tubular yokes.

5. In combination, a portable vehicle supported on a set of wheels, said wheels each having an axle with each wheel being mounted on the axle, said wheels being rotatable as the vehicle is moved on its wheels, tubular yokes, said tubular yokes being secured at corners of the vehicle to the vehicle, said wheels being rotatable about the axle as the vehicle is moved on its wheels, and brake means mounted on the vehicle and operatively connected to said wheels, said brake means exerting a force against an outer portion of an associated one of the wheels through an open end supported by a tubular yoke being a pintle axle of the associated wheel to inhibit rotation of the axle and the wheels supported thereon, said tubular yokes having yoke legs positioned on opposite sides of each wheel, said tubular yokes having a lower open end for overlying the outer circumference of the wheel, said brake means is mounted inside the tubular yokes, said brake means comprising a compression spring, friction means positioned beneath said compression spring inside the tubular yoke, shoulder means mounted above said compression spring holding said spring in place, said friction means exerting a force against the wheel through the open end supported by the tubular yoke, said friction means is a material selected from the group consisting of a series of weighted spherical balls and a solid tubular plunger, said friction means being positioned to rub against the outer circumference of the wheels and to inhibit rotation of the wheels, the force exerted by the brake means being such that when the vehicle is standing free and unattended, the force is sufficient to prohibit the vehicle from freely rolling around, the force, however, being insufficient to curb the movement of the vehicle when being pushed by a user.

6. The combination of claim 5 wherein the solid tubular plunger has a conical shaped head for engaging the wheel, the conical shaped head providing a reduced surface for exerting a braking action upon said wheel.

7. The combination of claim 5 wherein the shoulder means comprises a pin extended transversely through said tubular yoke, and means attaching said pin at its opposite ends to an associated one of the tubular yokes.

8. The combination of claim 5 wherein the shoulder means comprises a tubular shaft mounted within said tubular yoke, and means attaching said tubular shaft to an associated one of the tubular yokes.

9. A shopping cart supported on a set of wheels, wheel supporting tubular yokes secured at corners of the cart to the cart, the tubular yokes having yoke legs positioned on opposite sides of each wheel, said tubular yokes having a lower open end for overlying the outer circumference of the wheel, the wheels each having an axle with each wheel being mounted on the axle and being rotatable about the axle as the cart is moved on its wheels, a brake means is mounted inside the tubular yokes, said brake means comprising a compression spring, friction means positioned beneath said compression spring inside the tubular yoke, shoulder means mounted above said compression spring holding said spring in place, said friction means exerting a force against the wheel through the open end supported by the tubular yoke, said friction means is a material selected from the group consisting of a series of weighted spherical balls and a solid tubular plunger, said friction means being positioned to rub against the outer circumference of the wheels and to inhibit rotation of the wheels.

10. The shopping cart of claim 9 wherein the solid tubular plunger has a conical shaped head for engaging the wheel, the conical shaped head providing a reduced surface for exerting a braking action upon said wheel.

11. The shopping cart of claim 9 wherein the shoulder means comprises a pin extended transversely through said tubular yoke, and means attaching said pin at its opposite ends to an associated one of the tubular yokes.

12. The shopping cart of claim 9 wherein the shoulder means comprises a tubular shaft mounted within said tubular yoke, and means attaching said tubular shaft to an associated one of the tubular yokes.

* * * * *